United States Patent [19]
King et al.

[11] Patent Number: 5,339,341
[45] Date of Patent: Aug. 16, 1994

[54] MID SPAN MIXER GRID

[75] Inventors: Raymond A. King; David A. Farnsworth, both of Lynchburg; Jerome S. D'Orio, Forest, all of Va.

[73] Assignee: B&W Fuel Company, Lynchburg, Va.

[21] Appl. No.: 123,419

[22] Filed: Sep. 17, 1993

[51] Int. Cl.⁵ .............................................. G21C 3/34
[52] U.S. Cl. ................................ 376/439; 376/442; 376/462
[58] Field of Search ............... 376/439, 442, 438, 443, 376/462

[56] References Cited

U.S. PATENT DOCUMENTS

| | | | |
|---|---|---|---|
| 4,474,730 | 10/1984 | Heuman et al. | 376/462 |
| 4,692,302 | 9/1987 | DeMario et al. | 376/439 |
| 4,832,905 | 5/1989 | Bryan et al. | 376/462 |
| 5,094,802 | 3/1992 | Riordon, III | 376/443 |

Primary Examiner—Donald P. Walsh
Assistant Examiner—Frederick H. Voss
Attorney, Agent, or Firm—Robert J. Edwards; Vytas R. Matas

[57] ABSTRACT

A mixer grid for a nuclear reactor fuel assembly has a plurality of strips arranged in interlocking rows and columns defining a plurality of cells. A stopper is fixed to each corner of each cell for both directing coolant flow, providing coolant mixing and providing a smooth contact surface for the fuel rod. The stopper is either cone-shaped or cylindrical for directing and channeling coolant flow. The stopper also has a smooth, flat chamfered surface for contacting the fuel rod and minimizing damage upon the shifting of the fuel rod. The grid is attached to the nuclear reactor fuel assembly by using guide cells comprising a plurality of support arches for welding to the nuclear reactor fuel assembly.

7 Claims, 3 Drawing Sheets

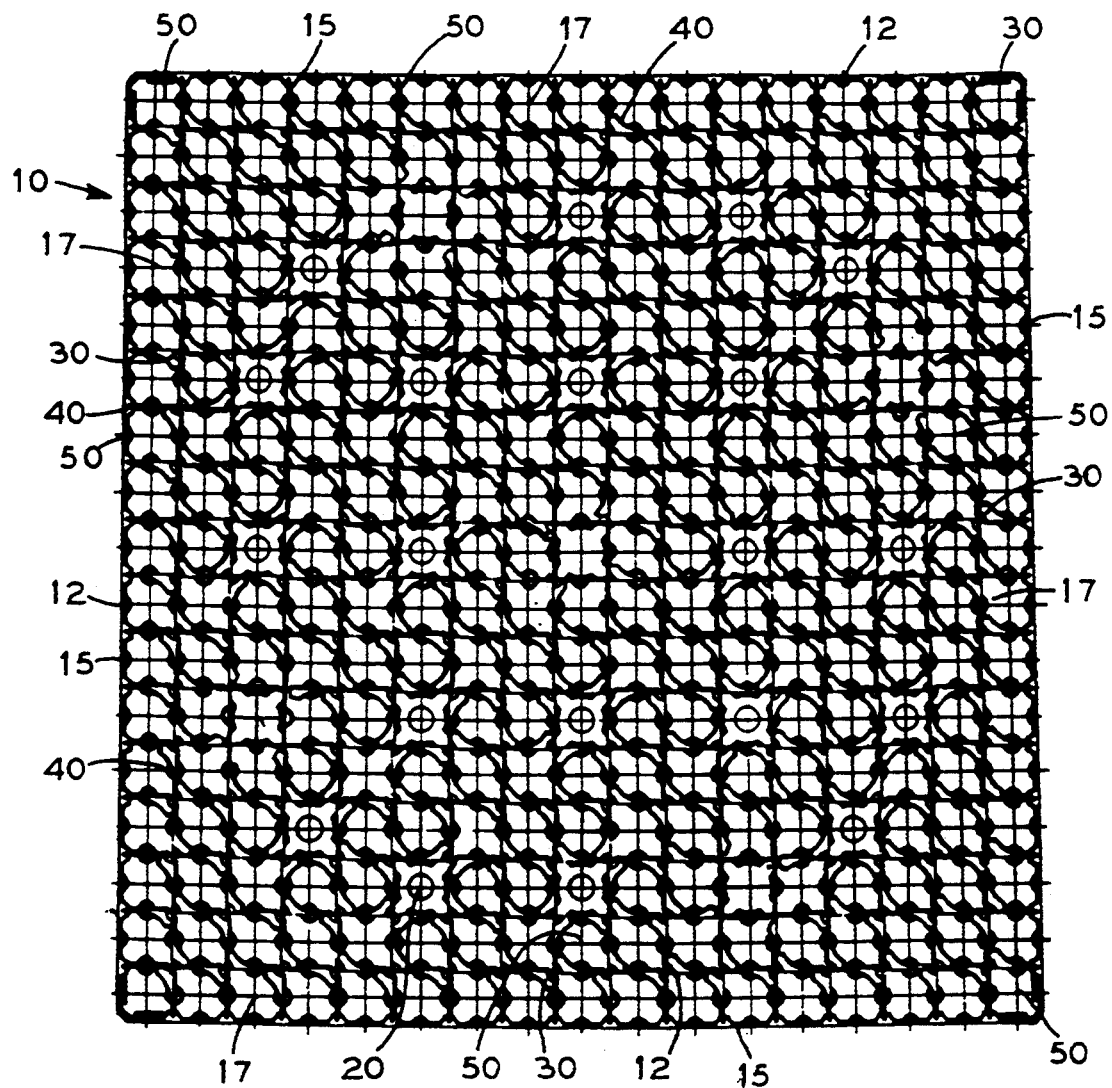
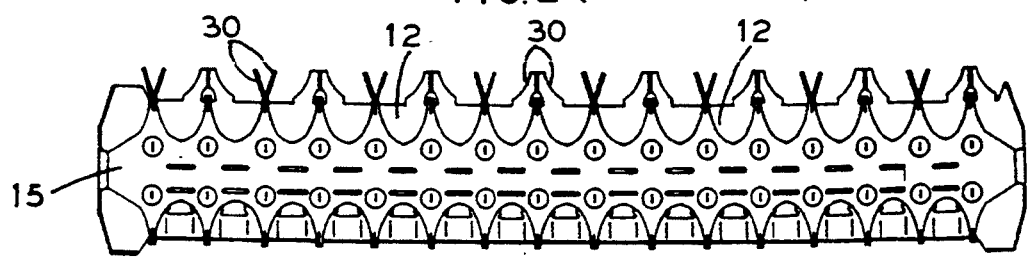
FIG. 2 (PRIOR ART)

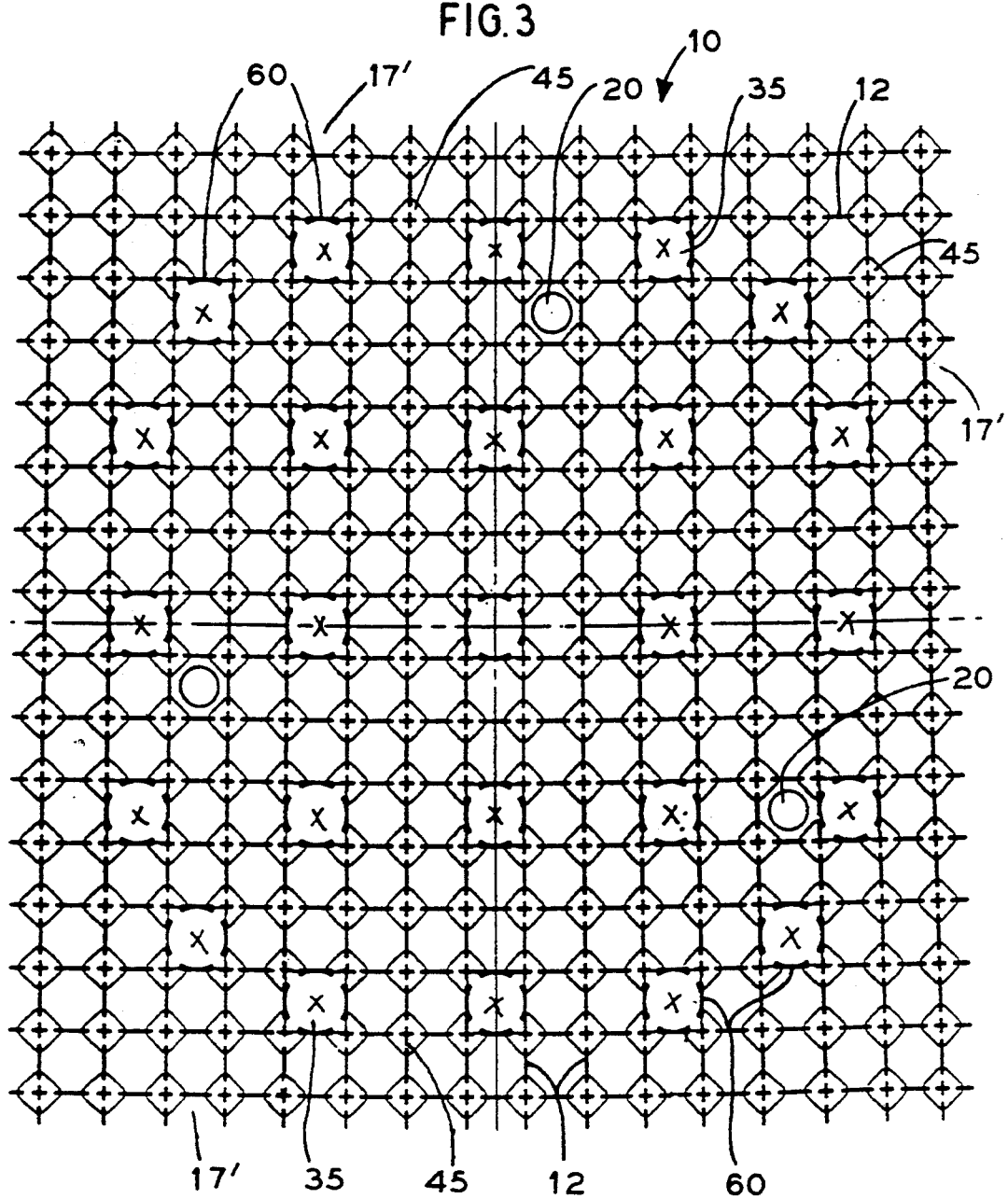

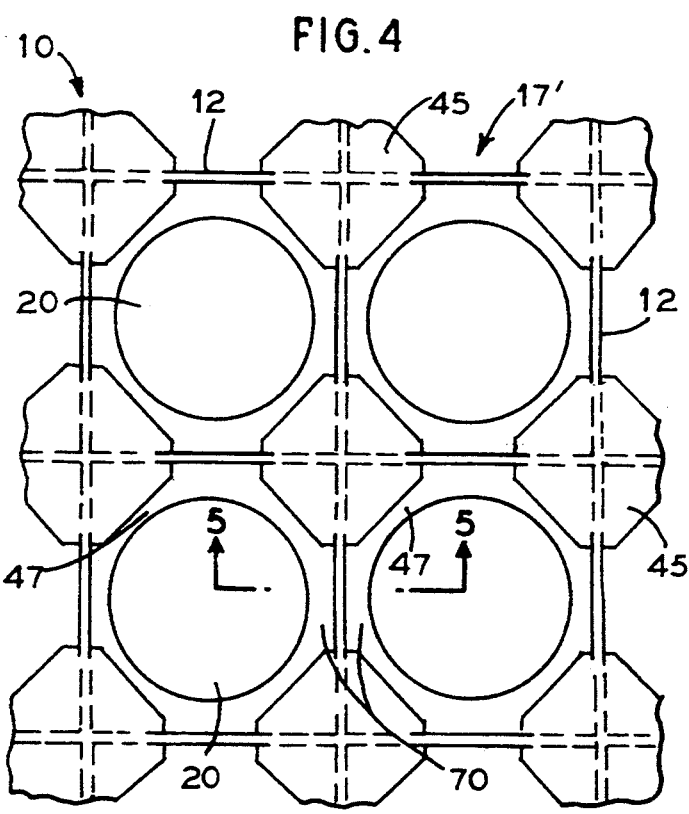
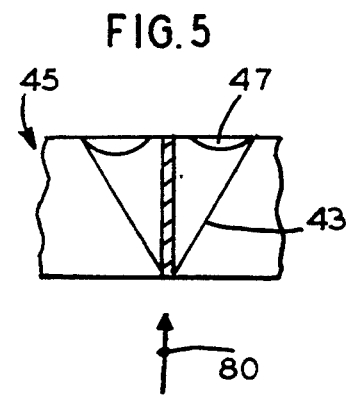
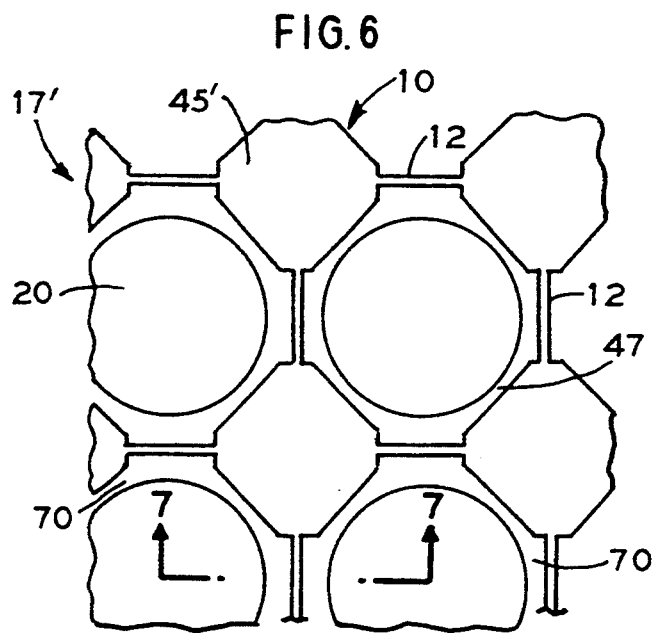
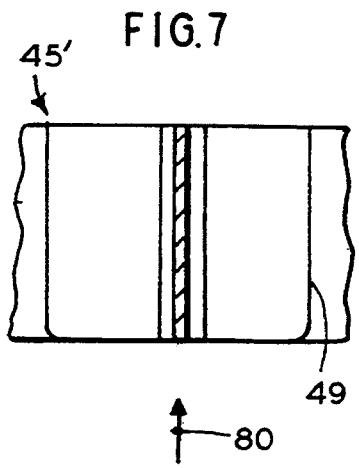

MID SPAN MIXER GRID

FIELD AND BACKGROUND OF THE INVENTION

The present invention relates in general to the cooling of nuclear reactors and in particular to a new and useful mixer grid for cooling the fuel rods of a nuclear reactor fuel assembly.

In the nuclear power field, it is common to use a mixer grid in conjunction with a nuclear reactor fuel assembly for enhancing the heat transfer between the nuclear fuel rods of the assembly and the coolant of the nuclear reactor.

U.S. Pat. No. 4,474,730 discloses a nuclear fuel spacer grid comprising a plurality of straps in an egg crate configuration defining a plurality of cells for enclosing the fuel rods for a nuclear reactor fuel assembly. A spring portion is provided on at least one of the straps of each cell and extends into each cell for pushing against the fuel rod contained therein. A back-up spring is positioned transverse to and behind each of the spring portions of the straps and is positioned so as not to touch the fuel rods within the cells.

U.S. Pat. No. 3,933,584 discloses a spacer grid for nuclear fuel rods comprising identical metal straps arranged in cross relation in order to define a multiplicity of cells for receiving elongated fuel elements such as rods. Tabs are used at the edges of the cell openings for the deflecting of coolant into the cells. Tabs from adjacent side walls are fixedly secured together in order to provide rigid flanges for the grid. Spring fingers are provided within each cell in order to hold the fuel rods against fixed stops.

U.S. Pat. No. 4,692,302 discloses a mixer grid for a nuclear reactor fuel assembly wherein the sole purpose of the grid is to promote cross flow mixing of the coolant of the reactor rather than support the fuel rods. At least one mixing vane is provided in each cell for directing coolant flow. Four dimple protrusions, which are open, extend into each cell and allow the flow of coolant therethrough and prevent damage to the fuel rods within each cell.

A major problem of the mixer grids commonly used in the nuclear reactor field is that both a separate stopper and mixing vane are used within the same cell for cooling hot spots within the grid and supporting the nuclear fuel rods. Hard stops used within each cell are aimed at preventing the fuel rods from contacting the mixing vanes of each cell while the mixing vanes are used to direct and channel coolant in each cell.

Additionally, it is common in the known mixer grids to use an outer strip around the grid for providing lead-in and coolant flow to hot spots of cells located on the periphery of the grid.

Moreover, it is common in the known mixer grids to use mixing vanes in every other peripheral cell of the mixer grid.

Presently, there is no known mixer grid which alleviates the need for using both a stopper and a mixing vane within each cell of the grid.

SUMMARY OF THE INVENTION

The present invention comprises a mixer grid for a nuclear fuel reactor assembly having a plurality of strips arranged in rows and columns and defining a plurality of cells for receiving fuel rods of the nuclear fuel reactor assembly.

The present invention also comprises a stopper fixed at each corner of each cell. The stoppers are used to direct and channel coolant flow as well as support the nuclear fuel rods within. The stoppers are cone-shaped or cylindrical-shaped for channeling the coolant throughout the grid for proper heat exchange with the fuel rods. Moreover, each stopper has a smooth, flat chamfered surface for supporting each fuel rod and minimizing fretting or damage to the rod.

The present invention also provides for some of the cells to be designated as guide assembly cells for attachment to the nuclear reactor fuel assembly. A plurality of support arches are fixed to the strips of each guide assembly cell for welding to the nuclear reactor fuel assembly.

It is an object of the present invention to provide a mixer grid for a nuclear reactor fuel assembly which provides for efficient heat transfer over those mixer grids found in the prior art.

It is another object of the proposed invention to provide non-contacting grid allowing for less complicated design and manufacturing.

It is another object of the present invention to provide a mixer grid for a nuclear reactor fuel assembly which alleviates the use of both stoppers and mixing vanes within each cell of the mixer grid.

It is yet another object of this invention to provide four (4) mixing devices per cell. This is not the case with other designs (FIG. 1) where it is not possible for the strips to provide a vane on two sides. This new design promotes more mixing.

It is another object of the present invention to provide a mixer grid wherein each cell of the grid uses a plurality of stoppers which direct coolant flow and may provide an area where the fuel rod may rest against without causing excessive wear on the fuel rods. The stoppers are in each corner of each cell which typically has the greatest flow of coolant through it due to the fact that this is a path of least resistance.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a top view of known mixer grid for a nuclear reactor fuel assembly;

FIG. 2 is an end view of FIG. 1;

FIG. 3 is a top view of the present invention;

FIG. 4 is a top view of a section of FIG. 3;

FIG. 5 is a view taken along line 5—5 of FIG.

FIG. 6 is a top view in section of a second embodiment of the present invention; and FIG. 7 is a view taken along line 7—7 of FIG. 6.

DESCRIPTION OFT HE PREFERRED EMBODIMENT

FIGS. 1 and 2 illustrate a known mixer grid for a nuclear reactor fuel assembly wherein the mixer grid comprises a grid structure, generally designated 10, comprising a plurality of strips 12 which are stamped and welded and assembled in an egg crate configuration. The arrangement of inner strips 12 provides for a plurality of individual cells 17 for receiving a fuel rod 20 of a nuclear reactor fuel assembly. This particular grid will also have the fuel rods 20 contacting each side of each cell.

Each cell 17 contains a soft spring stop which the fuel rod compresses. This provides support for the rods. Each cell 17 also has a plurality of hard stops 40 arranged along the inner strips 12 of the cells 17 for holding a fuel rod. In addition to the hard stops 40, mixing vanes 30 are provided in each cell 17 for directing the flow of coolant through the grid 10 for cooling the nuclear fuel rods and hot spots 50.

It is common to have an outer strip 15 on the periphery of the grid 10 for enclosing the grid 10. Outer strip 15 provides lead-in and coolant flow to the hotter spots 50 of the peripheral cells 17. These lead in tabs however will not provide the same amount of mixing as the stoppers. The periphery cells only have one vane directing flow whereas there are two (2) stoppers in each of the periphery cells of the invention.

FIG. 1 also illustrates that each cell 17 has both the hard stops 40 and mixing vanes 30 contained within each individual cell 17 which support the fuel rods and direct coolant flow.

FIG. 3 illustrates that the present invention comprises a mixer grid 10 having strips 12 arranged in interlocking rows and columns for forming individual cells 17' similar to the grid structures found in the prior art. The present invention allows for efficient loading and unloading of the mixer 10 by using guide thimble cells 35 for connection with the nuclear reactor fuel assembly. A plurality of support arches 60 are fixed within each guide thimble cell 35 for facilitating welding to the nuclear reactor fuel assembly.

FIG. 3 also illustrates that stoppers 45 are fixed at each corner of each cell 17' for increasing the level of coolant mixing while the chamfered edges provide a surface to contact in case of rod bow, shifting or misalignment. The flatness of the chamfer allows the fuel rod to wear at a much slower rate because of its lengths compared to the older style hard stops. Unlike the mixer grids found in the prior art, the present invention does not use an outer strip for confining the peripheral cells. The peripheral cells 17' are left open and the grid 10 is positioned in-board a distance, for instance 0.25 inches, reducing the risk of the grid 10 contacting adjacent fuel assemblies during loading, unloading and faulted conditions.

Even without the outer strip, the present invention allows for the peripheral cells 17' to receive more coolant because of the stoppers 45. In known devices there are two (2) corner cells that do not have vanes as shown in FIG. 1. The lead in tabs may provide for some mixing but the actual amount of surface area engaged by coolant makes the mix very small. By way of contrast each corner cell of the current design has one stopper for providing increased mixing.

FIG. 4 illustrates a stopper 45 fixed at each corner of each cell 17'. A fuel rod 20 is located within each cell 17'.

Stoppers 45 force the coolant into the hot spots of the fuel assembly seen in FIG. 4 increase the level of mixing in the coolant and thus increases the heat transfer between the fuel rods 20 and the coolant for the reactor. The increased mixing of the coolant allows for an increase in the overall power output of the nuclear reactor.

The increased mixing results from the stopper more effectively providing coolant to the hot spots. The hot spots are located radially between each fuel rod, which is the area where the rods are closest together. The stopper forces the water into each hot area as well as mixing the coolant.

The present invention allows for the stopper 45 to perform both the coolant flow diverting and mixing and to provide a nondamaging contact surface. Thus, the problems with the mixing vane 30 and the hard stop 40, shown in FIG. 1, previously mentioned, is avoided.

FIG. 5 illustrates a stopper 45 having a cone-shaped or conical configuration for directing coolant flow 80 to hot spot areas 70 shown in FIG. 4. Conical stopper 45 has a chamfer 47 which is a flat, smooth beveled edge for accepting fuel rod 20 contact and reducing fretting and damage to the fuel rods 20 as illustrated in FIG. 4. Edge 43 of conical stopper 45 assists in directing coolant flow 80 over the grid 10 as shown in FIG. 5.

FIGS. 6–7 illustrate a stopper 45' having a cylindrical configuration for channeling the coolant flow 80 over the grid 10. Cylindrical stopper 45' has radiused edges 49 which direct the coolant flow 80.

The conical stopper is more efficient than the cylindrical as it reduces the drag on the coolant. However, it would probably be the more expensive to manufacture. Both could be manufactured by known techniques such as EDM or separate stoppers may be welded to an egg crate configuration.

Stoppers 45 (FIG. 4), 45' (FIG. 6) both direct the flow of coolant 80 (FIGS. 5 and 7) to hot areas 70 (FIGS. 4 and 6) based on two principles: 1. the stoppers 45, 45' provide a path of least resistance due to the water channel dimensions of the stoppers and 2. the stoppers provide a flow diversion due to the water channel blockage provided.

Due to the chamfer 47 of the stopper 45, 45' (FIGS. 4 and 6), fuel rods 20 can rest or contact the chamfer 47 which prevents damage or fretting to the rod 20 should the rod 20 shift its position.

The present invention provides for a stopper 45, 45' in each corner of each cell 17' resulting in a uniform configuration for each cell 17' which is unlike the uneven pattern of mixing vanes used in conjunction with known mixer grids. The present invention provides for a more even distribution of coolant flow 80 (FIGS. 5 and 7) and may minimize the lateral movement of the fuel assembly.

The present invention allows for better heat transfer over the mixer grid 10 than currently found on mixer grids employing the standard mixing vane design. The increased heat transfer ability of the present invention also provides for an increase power output for the nuclear reactor. Additionally, by not employing an outer strip, the present invention does not interfere with or cause damage to adjacent assemblies during loading or unloading of the mixer grid.

While a specific embodiment of the invention has been shown and described in detail to illustrate the application of the principles of the invention, it will be understood that the invention may be embodied otherwise without departing from such principles.

What is claimed is:

1. A mixer grid for a nuclear reactor fuel assembly, the grid comprising:

a plurality of strips arranged in interlocking rows and columns defining a plurality of cells therebetween, the cells for receiving a nuclear fuel rod of a nuclear reactor fuel assembly, the strips interlocking at a corner of each cell; and a stopper fixed to each corner of each cell for channeling and mixing a coolant through each cell for cooling the nuclear fuel rods of the nuclear reactor fuel assembly.

2. The mixer grid according to claim 1, wherein the stopper is cone-shaped.

3. The mixer grid according to claim 1, wherein the stopper is cylindrically-shaped.

4. The mixer grid according to claim 1, wherein the stopper has a smooth chamfered surface.

5. The mixer grid according to claim 1, wherein a plurality of the cells are used as guide cells for the welding of the grid to the nuclear reactor fuel assembly.

6. The mixer grid according to claim 5, wherein each guide cell comprises a plurality of support arches fixed to the strips defining the guide cell.

7. The mixer grid according to claim 6, wherein the support arches are welded to the nuclear reactor fuel assembly.

* * * * *